United States Patent
Chen

(10) Patent No.: US 11,667,038 B2
(45) Date of Patent: Jun. 6, 2023

(54) SAFETY SWITCH DEVICE ATTACHED TO MOBILE TERMINAL FOR OPERATING MACHINE AND MACHINE OPERATION DEVICE INCLUDING SAFETY SWITCH DEVICE

(71) Applicant: Fanuc Corporation, Yamanashi (JP)

(72) Inventor: Tan Qin Chen, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 109 days.

(21) Appl. No.: 16/911,494

(22) Filed: Jun. 25, 2020

(65) Prior Publication Data

US 2021/0008728 A1 Jan. 14, 2021

(30) Foreign Application Priority Data

Jul. 9, 2019 (JP) .............................. JP2019-127800

(51) Int. Cl.
| | |
|---|---|
| *B25J 13/06* | (2006.01) |
| *G05G 1/02* | (2006.01) |
| *G05G 1/01* | (2008.04) |
| *B25J 13/08* | (2006.01) |
| *G05G 11/00* | (2006.01) |
| *F16B 2/12* | (2006.01) |
| *B25J 19/06* | (2006.01) |
| *B60R 11/00* | (2006.01) |

(Continued)

(52) U.S. Cl.
CPC ............. *B25J 13/06* (2013.01); *B25J 13/081* (2013.01); *F16B 2/12* (2013.01); *G05G 1/01* (2013.01); *G05G 1/02* (2013.01); *G05G 11/00* (2013.01); *B25J 19/06* (2013.01); *B60R 2011/0071* (2013.01); *F16M 11/041* (2013.01); *F16M 2200/00* (2013.01); *H04M 1/026* (2013.01)

(58) Field of Classification Search
CPC ........... B25J 13/06; B25J 13/081; G05G 1/02; F16B 2/12; F16M 11/041; F16M 2200/00; H04M 1/026
See application file for complete search history.

(56) References Cited

U.S. PATENT DOCUMENTS

| | | | |
|---|---|---|---|
| 8,240,628 B2 * | 8/2012 | Huang ................... | F16M 13/00 248/176.1 |
| 9,597,807 B2 * | 3/2017 | Wu .......................... | B25J 13/06 |

(Continued)

FOREIGN PATENT DOCUMENTS

| | | |
|---|---|---|
| JP | 08090485 A | 4/1996 |
| JP | 11216693 A | 8/1999 |

(Continued)

*Primary Examiner* — Eret C McNichols
(74) *Attorney, Agent, or Firm* — RatnerPrestia

(57) ABSTRACT

A safety switch device includes a first support member and a second support member which are formed so as to secure a mobile terminal, and a grip part to be grasped by an operator's hand. The safety switch device includes an enable switch for transmitting a signal for permitting a robot to operate, and an emergency stop button for transmitting a signal for stopping the robot. The first support member and the second support member are formed so as to secure a plurality of types of mobile terminals having different sizes. The grip part is disposed at the center part of the shape of the back surface of the mobile terminal, which corresponds to the position of the center of gravity of the mobile terminal.

7 Claims, 17 Drawing Sheets

(51) Int. Cl.
  *H04M 1/02*     (2006.01)
  *F16M 11/04*    (2006.01)

(56)         References Cited

U.S. PATENT DOCUMENTS

|  |  |  |  |  |
|---|---|---|---|---|
| 9,981,378 | B2 * | 5/2018 | Kogan | ..................... B25J 13/06 |
| 10,099,383 | B2 * | 10/2018 | Riedel | ..................... B25J 13/06 |
| 10,442,088 | B2 | 10/2019 | Kino | |
| 10,780,580 | B2 * | 9/2020 | Fukunaga | ................ B25J 13/06 |
| 10,890,943 | B2 * | 1/2021 | Gryglewski | ......... G05B 19/106 |
| 10,920,927 | B2 * | 2/2021 | Shim | ................... F16M 11/205 |
| 2005/0141681 | A1 | 6/2005 | Graiger | |
| 2016/0114478 | A1 * | 4/2016 | Wu | ......................... B25J 13/06 |
| | | | | 901/3 |
| 2016/0144513 | A1 * | 5/2016 | Fukunaga | ............ G05B 19/409 |
| | | | | 901/5 |
| 2016/0297067 | A1 * | 10/2016 | Kogan | ..................... B25J 13/06 |
| 2019/0299404 | A1 * | 10/2019 | Muneto | .................... B25J 9/163 |
| 2019/0384359 | A1 * | 12/2019 | Gryglewski | ....... B23Q 11/0092 |
| 2020/0338748 | A1 * | 10/2020 | Tanaka | ................... B25J 13/081 |

FOREIGN PATENT DOCUMENTS

| | | |
|---|---|---|
| JP | 2001038661 A | 2/2001 |
| JP | 2004122243 A | 4/2004 |
| JP | 2013202731 A | 10/2013 |
| JP | 2017202550 A | 11/2017 |
| JP | 2018167396 A | 11/2018 |
| JP | 2018176359 A | 11/2018 |

* cited by examiner

SAFETY SWITCH DEVICE ATTACHED TO MOBILE TERMINAL FOR OPERATING MACHINE AND MACHINE OPERATION DEVICE INCLUDING SAFETY SWITCH DEVICE

CROSS-REFERENCE TO RELATED APPLICATIONS

This application is a new U.S. Patent Application that claims benefit of Japanese Patent Application No. 2019-127800, filed Jul. 9, 2019, the disclosure of which is incorporated herein by reference in its entirety for all purposes.

BACKGROUND OF THE INVENTION

1. Field of the Invention

The present invention relates to a safety switch device attached to a mobile terminal for operating a machine, and a machine operation device including the safety switch device.

2. Description of the Related Art

Machines such as robots are controlled by machine controllers. In prior arts, an operation device, which can be carried by an operator so that the operator can easily operate a machine and which is connected to a machine controller, is known (for example, Japanese Unexamined Patent Publication No. 2004-122243A and Japanese Unexamined Patent Publication No. 2001-38661A). The machine operation device is formed so as to be able to communicate with the machine controller via a communication line.

In recent years, the use of a mobile terminal such as a tablet, as a device for operating a machine has been proposed (for example, Japanese Unexamined Patent Publication No. 2018-167396A and Japanese Unexamined Patent Publication No. 2017-202550A). The mobile terminal, such as a tablet, includes a touch panel type display. The mobile terminal can display information about the machine. The operator can check, for example, the state of the machine and confirm a setting value for operating the machine. Further, images, such as buttons, displayed on the display are operated so that the machine can be operated, or the predetermined information can be input. Thus, the operator can operate the machine and input the information even at a position away from the controller.

SUMMARY OF THE INVENTION

When an operation device is connected to a controller, an operator can operate a machine while standing at various positions and watching the state of the machine. For example, a robot can be manually driven while the position and orientation of the robot are checked.

When the operation device includes a mobile terminal, a device by which an operator can grasp the operation device with one hand is proposed. The operator can grasp the operation device with one hand and operate it with the other hand. However, when the operator holds the operation device with one hand and continues to operate the machine, there is the problem that the burden on the hand increases and the operator becomes tired. In particular, when the operator operates the device for a long time, the fatigue of the operator is remarkable.

Further, when a mobile terminal having a large screen is used, the weight of the mobile terminal increases. Alternatively, a safety switch, such as an emergency stop button, for instantly stopping the machine can be arranged in a device for grasping the mobile terminal with a hand. The installation of the safety switch increases the weight of the operation device. As the weight of the operation device increases, the burden on the operator increases.

A first aspect of the present disclosure is a safety switch device attached to a mobile terminal for operating a machine. The safety switch device includes a fixation mechanism formed so as to secure the mobile terminal, and a grip part supported by the fixation mechanism and grasped by the operator. The safety switch device includes a permission switch disposed on the grip part for transmitting a signal for permitting the machine to operate, and an emergency stop button for transmitting a signal for stopping the machine. The fixation mechanism is formed so as to secure a plurality of types of mobile terminals having different sizes. The grip part is supported by the fixation mechanism so as to be disposed at the center part of the shape of the back surface of the mobile terminal, which corresponds to the position of the center of gravity of the mobile terminal.

A second aspect of the present disclosure is a machine operation device including the above-described safety switch device and a mobile terminal secured to the safety switch device.

DETAILED DESCRIPTION

Referring to FIGS. 1 to 17, a safety switch device and a machine operation device including the safety switch device in an embodiment will be described. In the present embodiment, a robot and a hand will be described as examples of machines operated by the operation device.

Figure 1:
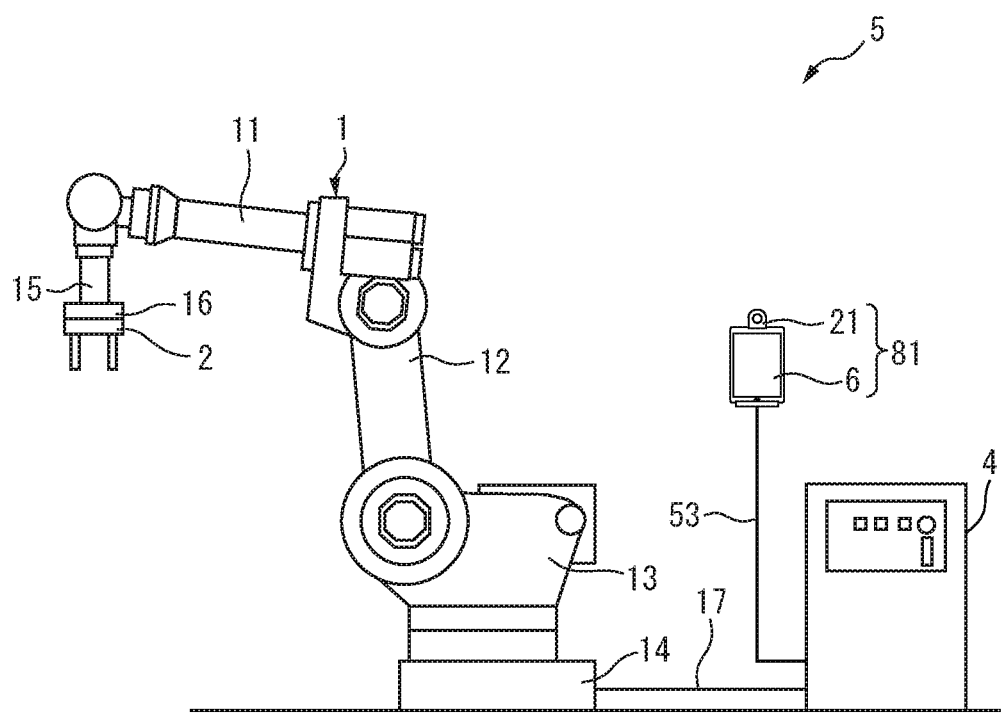
FIG. 1 is a schematic view of a robot device in an embodiment.
Figure 2:
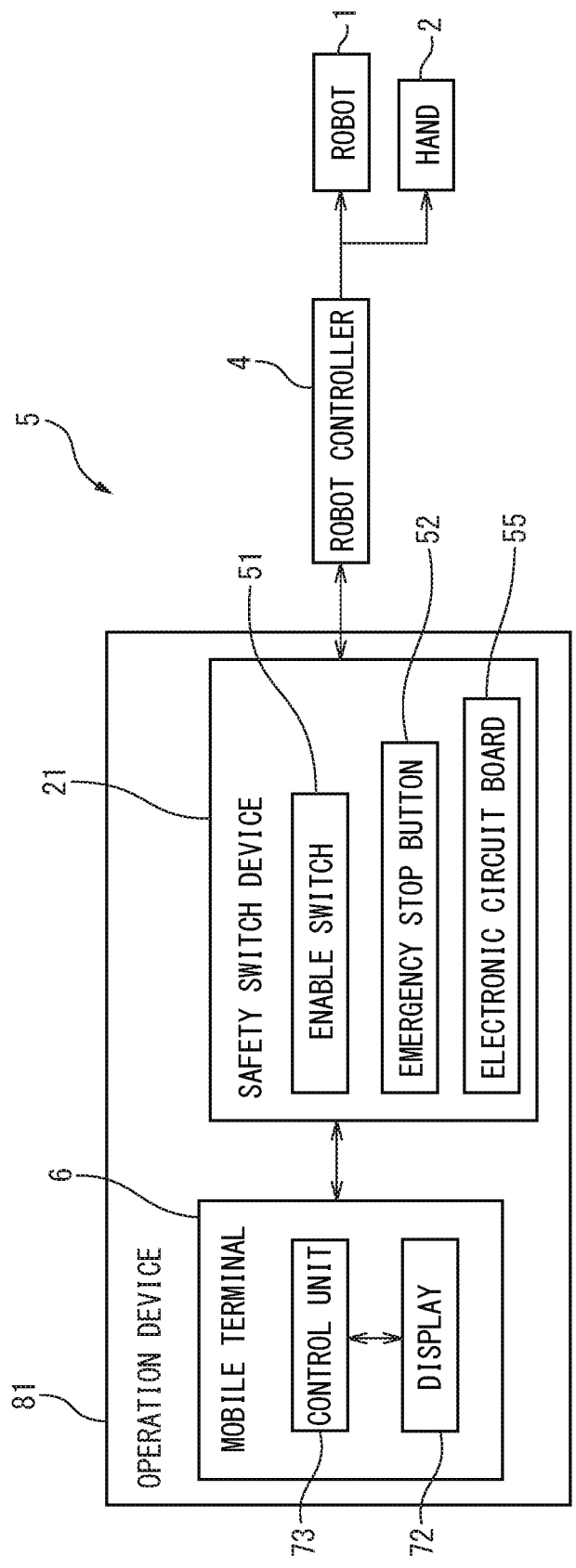
FIG. 2 is a block diagram of the robot device in the embodiment.

FIG. 1 is a schematic view of a robot device in the present embodiment. FIG. 2 is a block diagram of the robot device in the present embodiment. Referring to FIGS. 1 and 2, a robot device 5 includes a hand 2 as an operation tool, and a robot 1 which moves the hand 2. The robot 1 of the present embodiment is an articulated robot including a plurality of joints.

The robot 1 includes a base part 14 secured to the installation surface, and a rotation base 13 supported by the base part 14. The rotation base 13 rotates with respect to the base part 14. The robot 1 includes an upper arm 11 and a lower arm 12. The lower arm 12 is rotatably supported by the rotation base 13 via a joint. The upper arm 11 is rotatably supported by the lower arm 12 via a joint. The robot 1 includes a wrist 15 coupled to an end of the upper arm 11. The wrist 15 is rotatably supported by the upper arm 11 via a joint. The wrist 15 includes a flange 16 configured to be rotatable. The hand 2 is secured to the flange 16 of the wrist 15.

The robot 1 of the present embodiment has six drive axes, but the embodiment is not limited to this. As the robot, any robot capable of changing the position and orientation of the operation tool can be adopted. Further, as the operation tool, any operation tool in accordance with the operation performed by the robot device can be adopted. For example, when the robot device performs a spot welding operation, a spot welding gun can be used as the operation tool.

The robot device 5 includes a robot controller 4 for controlling the robot 1 and the hand 2. The robot controller 4 functions as a machine controller. The robot controller 4 includes an arithmetic processing device (computer) having a CPU (Central Processing Unit) as a processor. The robot 1 and the hand 2 are connected to the robot controller 4 via a cable 17.

The robot device 5 includes a first operation device 81 connected to the robot controller 4 via a cable 53. The operation device in the present embodiment functions as a teach pendant for setting the position and orientation of the robot 1 in order to generate operation programs for the robot 1 and the hand 2.

Figure 3:
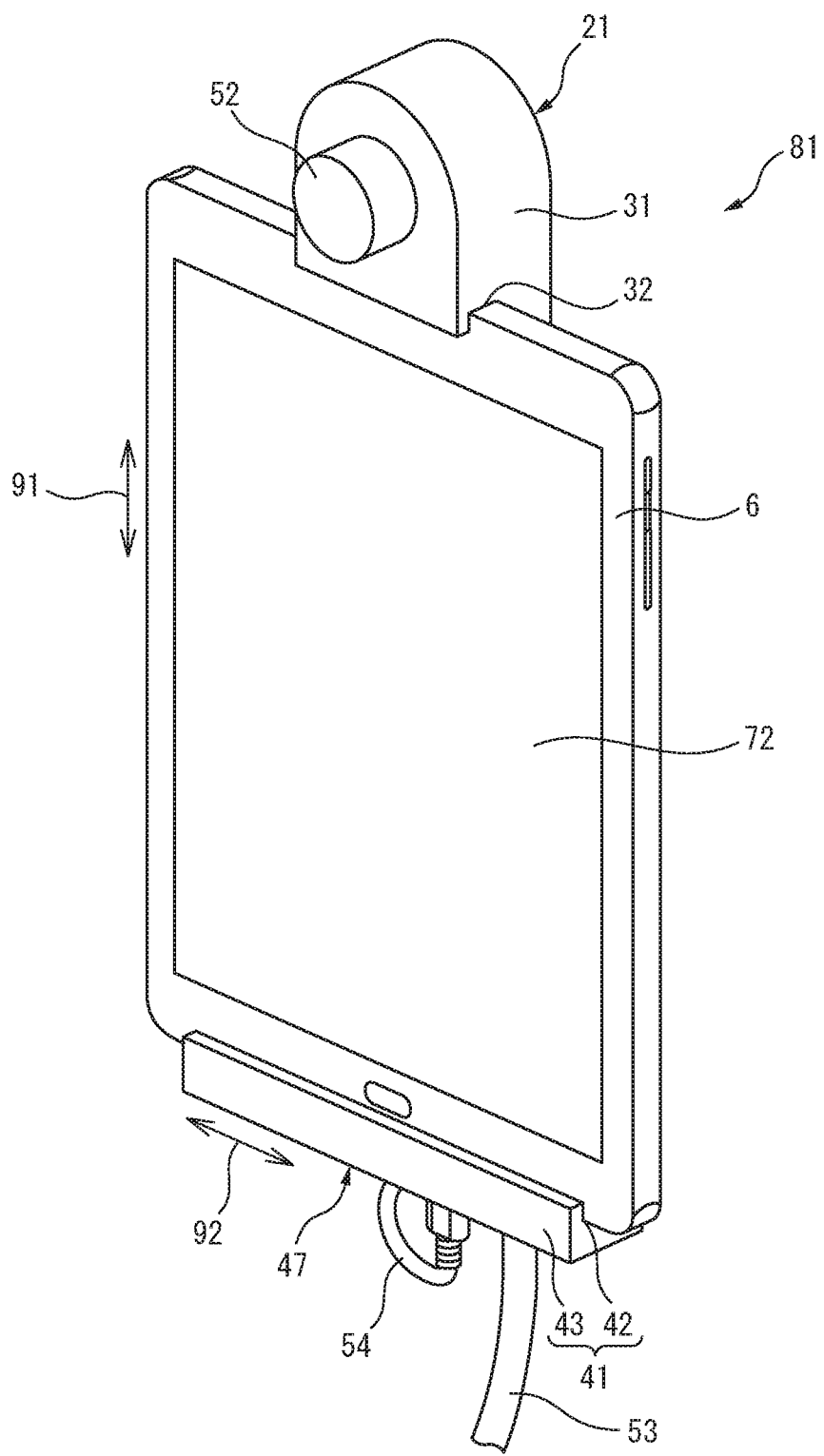
FIG. 3 is a perspective view of a first operation device in the embodiment when viewed from the front side.
Figure 4:
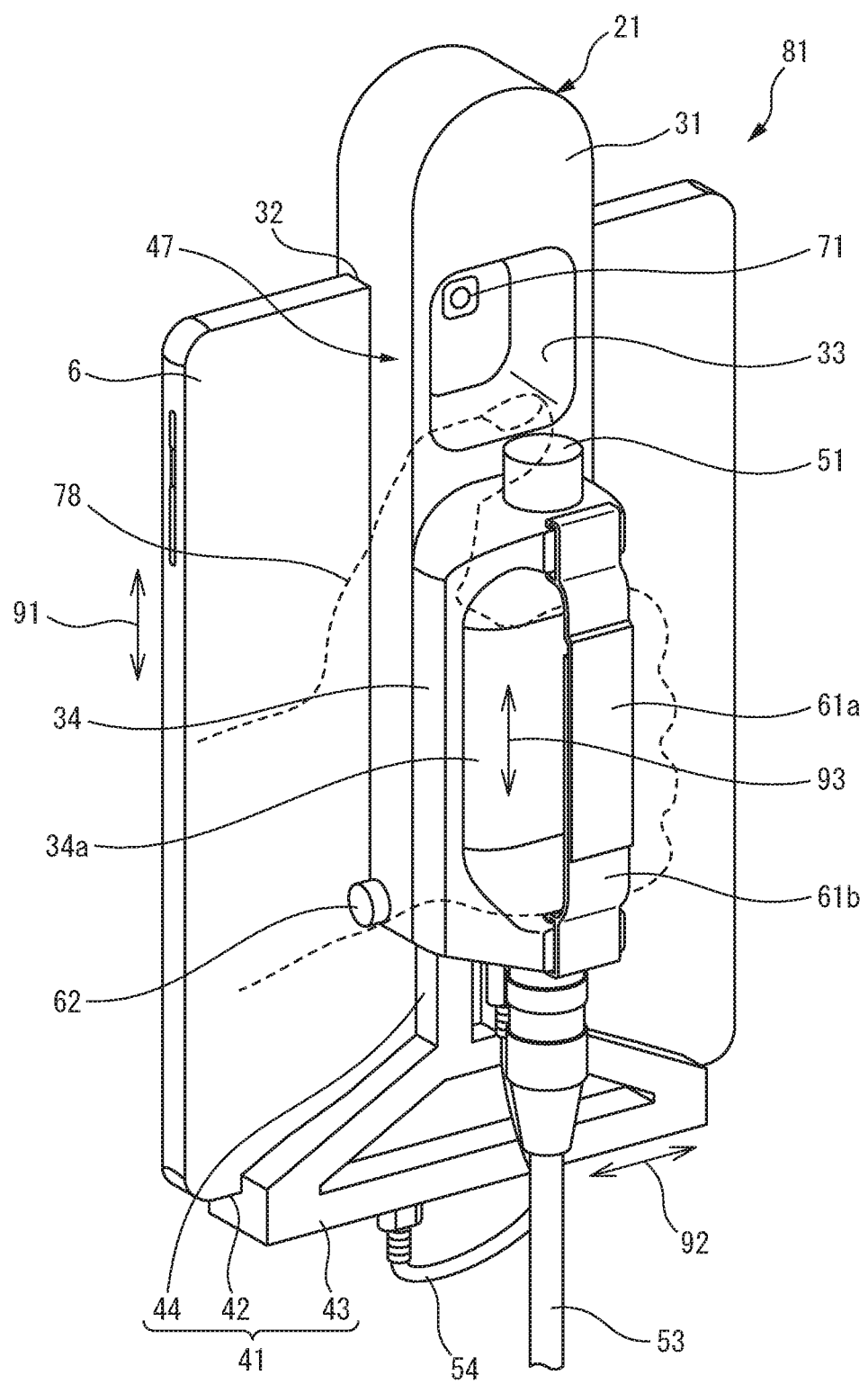
FIG. 4 is a perspective view of the first operation device when viewed from the rear side.
Figure 5:
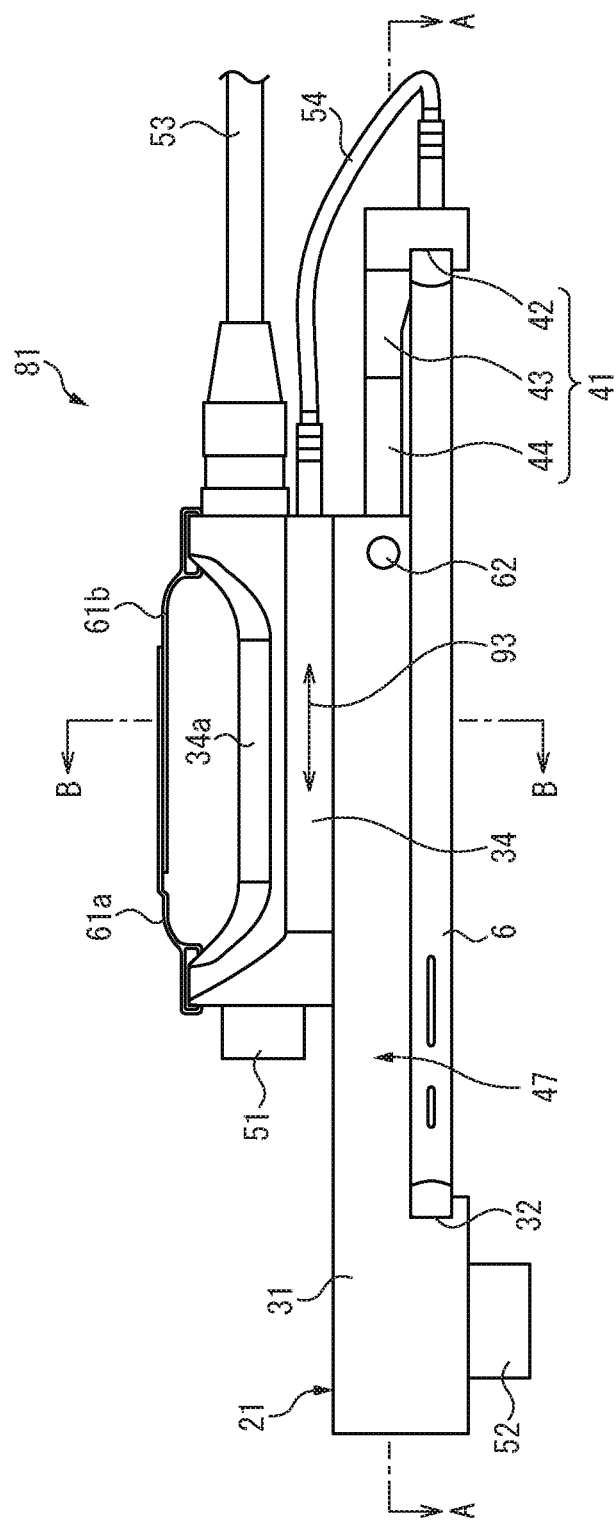
FIG. 5 is a side view of the first operation device.

FIG. 3 is a perspective view of the first operation device in the present embodiment when viewed from the front side. FIG. 4 is a perspective view of the first operation device when viewed from the back side. FIG. 5 is a side view of the first operation device. Referring to FIGS. 2 to 5, the first operation device 81 includes a mobile terminal 6 for operating the robot 1 and the hand 2, and a first safety switch device 21 formed so as to secure the mobile terminal 6.

The mobile terminal 6 in the present embodiment is a tablet-type arithmetic processing device (computer). The mobile terminal 6 in the present embodiment includes a control unit 73 including a CPU, and a touch panel type display 72. As the touch panel type display 72, any type of display such as a resistive film type display, an electrostatic capacitive type display, and a surface acoustic wave type display can be adopted.

The display 72 is formed so as to be able to display the information about machines, such as the state of the robot 1 and the hand 2. Further, the display 72 functions as an operation part by which the operator inputs. The display 72 is formed so as to display images, such as buttons for operating the robot 1 and the hand 2. The mobile terminal 6 is formed so as to transmit a command for operating the robot 1 and the hand 2 by pressing the screen of the display 72 with a finger.

The mobile terminal in the present embodiment is a tablet type computer, but the embodiment is not limited to this. Any mobile terminal capable of operating a machine can be adopted. For example, the mobile terminal may be, for example, a smartphone.

The safety switch device 21 of the present embodiment is formed so that an operator can support the operation device 81 with one hand. The safety switch device 21 includes a fixation mechanism 47 formed so as to secure the mobile terminal 6. The safety switch device 21 has a grip part 34 supported by the fixation mechanism 47 and grasped by a hand 78 of the operator.

In the present embodiment, when the operator holds the operation device 81, the direction extending substantially vertically is referred to as up-down direction. The arrow 91 indicates the up-down direction. Further, when the operator holds the operation device 81, the direction extending substantially horizontally is referred to as left-right direction. The arrow 92 indicates the left-right direction.

The fixation mechanism 47 of the present embodiment includes a first support member 31 having a first recess part 32 which engages with one end of the mobile terminal 6. The first recess part 32 of the first safety switch device 21 has a shape which fits into the upper end of the mobile terminal 6. The first recess part 32 is in close contact with the end of the mobile terminal 6. The fixation mechanism 47 includes a second support member 41 having a second recess part 42 which engages with the other end of the mobile terminal 6. The second recess part 42 of the first safety switch device 21 has a shape which fits into the lower end of the mobile terminal 6. The second recess part 42 is in close contact with the end of the mobile terminal 6. The fixation mechanism 47 of the first safety switch device 21 has a function of sandwiching the mobile terminal 6 in the up-down direction by the first support member 31 and the second support member 41.

Figure 6:
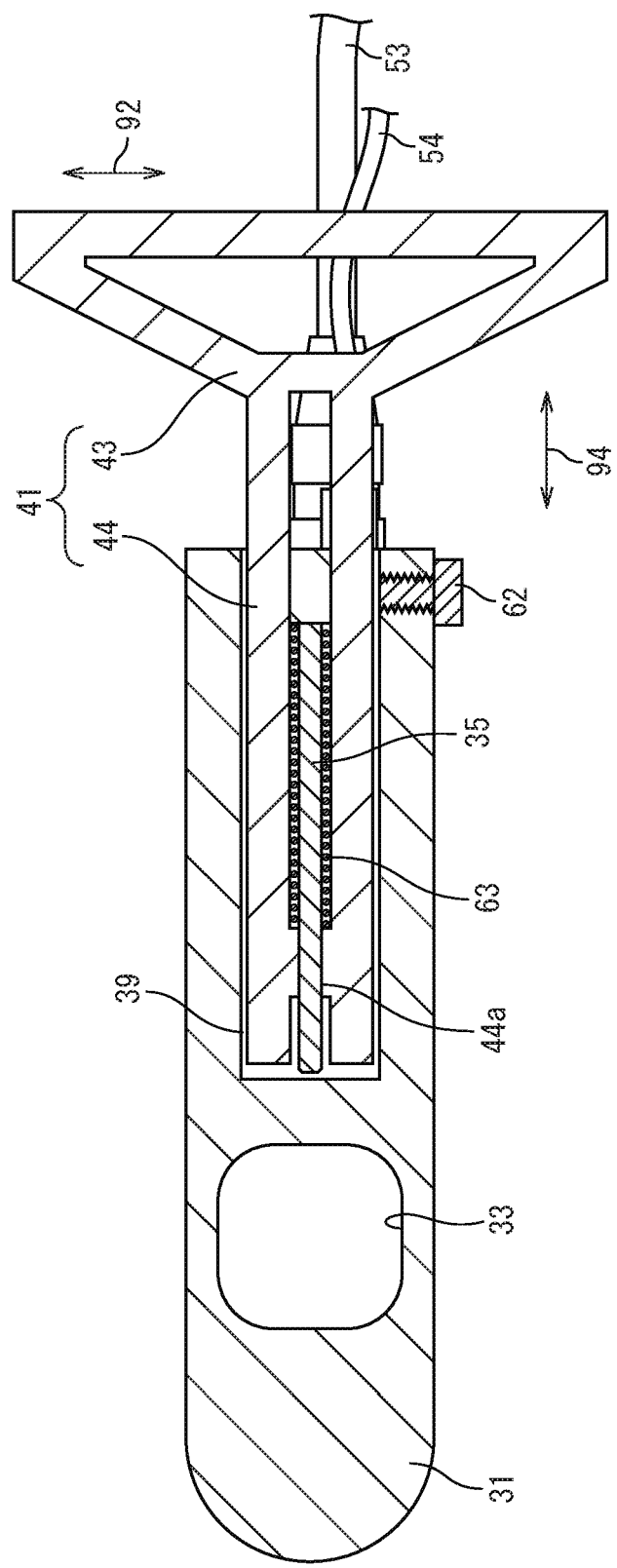
FIG. 6 is a first sectional view of the first operation device.
Figure 7:
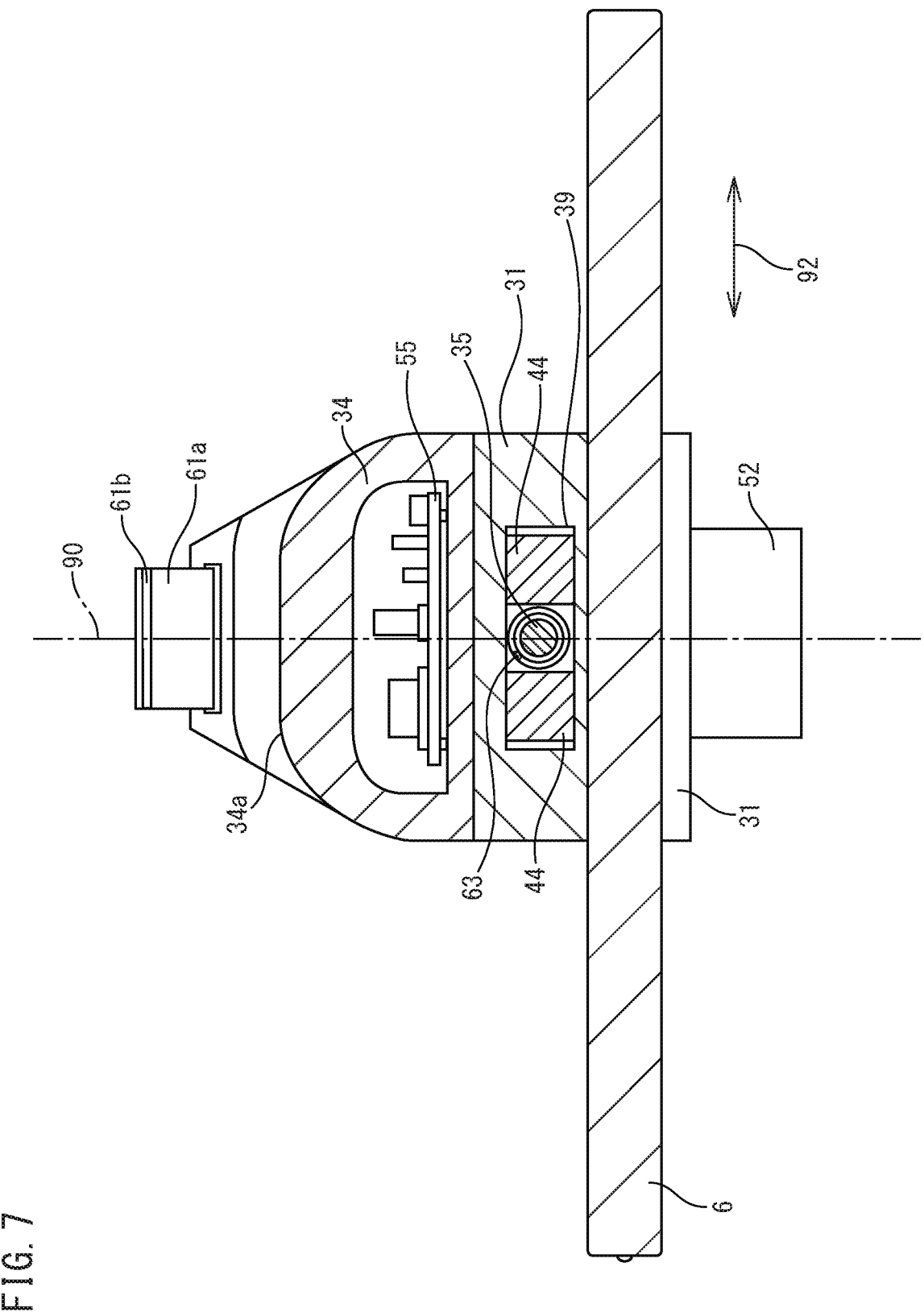
FIG. 7 is a second sectional view of the first operation device.

FIG. 6 is a sectional view when cutting along line A-A in FIG. 5. FIG. 7 is a schematic sectional view when cutting along line B-B in FIG. 5. Referring to FIGS. 5 to 7, the second support member 41 of the present embodiment is formed so as to slide with respect to the first support member 31. The second support member 41 has an engagement part 43 having a second recess part 42 which engages with the mobile terminal 6, and a slide part 44 formed so as to extend from the engagement part 43. The engagement part 43 of the present embodiment is formed such that the second recess part 42 extends in the left-right direction designated by arrow 92.

The first support member 31 has a hole 39 formed so as to extend along the longitudinal direction of the first support member 31. The slide part 44 of the second support member 41 is inserted into the hole 39. A rod part 35 is disposed inside the hole 39 so as to extend from the first support member 31 along the hole 39. One end face of the rod part 35 is secured to the first support member 31. The slide part 44 of the second support member 41 has a hole 44a through which the rod part 35 is inserted. A spring 63 is arranged around the rod part 35. The slide part 44 moves along the rod part 35 in the direction designated by arrow 94. The spring 63 biases the slide part 44 in the extending direction of the spring 63.

When attaching the first support member 31 and the second support member 41 to the mobile terminal 6, the operator pulls and separates the engagement part 43 of the second support member 41 from the first support member 31. The spring 63 contracts, and thereby the engagement part 43 is biased in the direction for approaching to the first support member 31. The operator arranges the mobile terminal 6 between the first recess part 32 of the first support member 31 and the second recess part 42 of the second support member 41. Then, the operator moves the engagement part 43 toward the first support member 31 in accordance with the biasing force of the spring 63, so that the mobile terminal 6 can be sandwiched between the first recess part 32 and the second recess part 42. The position of the second support member 41 with respect to the first support member 31 can be determined in accordance with the size of the mobile terminal 6.

The fixation mechanism 47 of the safety switch device 21 includes a screw 62 as a securing member for securing the second support member 41 to the first support member 31. The screw 62 is inserted from a side surface of the first support member 31. The screw 62 is tightened and thereby presses the slide part 44 of the second support member 41. After the mobile terminal 6 is sandwiched between the first recess part 32 and the second recess part 42, the screw 62 is tightened and thereby secures the second support member 41 to the first support member 31.

With the fixation mechanism 47 of the present embodiment, the mobile terminal 6 can be easily attached or detached. The operator can attach and detach the mobile terminal 6 to and from the safety switch device 21 with a small number of operations. For this reason, for example, when a plurality of robots are installed in a factory, the safety switch device in the present embodiment can be connected to the controller for each robot. Further, when the robot s operated by the operation device 81, the mobile terminal 6 can be secured to the safety switch device 21 and used. When the robot 1 is not operated by the operation device 81, the mobile terminal 6 can be removed from the safety switch device 21. Further, the mobile terminal can be detached from the safety switch device connected to one robot controller, and then, can be attached to a safety switch device connected to another robot controller. In this way, a single mobile terminal can be used to operate a plurality of robots.

Furthermore, in the fixation mechanism 47 of the present embodiment, the second support member 41 slides with respect to the first support member 31. The second support member 41 can be pulled out from the first support member 31 and thereby being secured at any position relative to the first support member 31. In other words, the distance between the second recess part 42 of the second support member 41 and the first recess part 32 of the first support member 31 can be adjusted. For this reason, the fixation mechanism 47 of the present embodiment can secure a plurality of types of mobile terminals having different sizes. For example, the fixation mechanism 47 of the present embodiment can secure a mobile terminal having a first size. Further, a mobile terminal having a second size larger than the first size can be secured.

Note that the fixation mechanism 47 is not limited to a mechanism in which the second support member 41 slides with respect to the first support member 31, and may be any mechanism which can secure a plurality of types of mobile terminals having different sizes. For example, a mechanism for securing the second support member to the outer peripheral surface of the first support member with a screw or the like may be adopted.

Referring to FIGS. 4 and 5, the safety switch device 21 of the present embodiment has the grip part 34 to be grasped by the operator's hand 78. The grip part 34 of the first safety switch device 21 is secured to the first support member 31. The grip part 34 has the longitudinal direction designated by arrow 93. The grip part 34 is arranged such that the longitudinal direction of the grip part 34 is parallel to the up-down direction designated by arrow 91. The grip part 34 has a contact surface 34a with which the palm of the operator's hand 78 (the front of the hand) is to come into contact.

The grip part 34 is supported, by the fixation mechanism 47, so as to be disposed at the center part of the shape of the back surface of the mobile terminal 6, which corresponds to the position of the center of gravity of the mobile terminal 6. In particular, the grip part 34 of the present embodiment is disposed immediately below the position of the center of gravity of the mobile terminal 6. The back surface of the mobile terminal 6 in the present embodiment is rectangular. The grip part 34 is disposed substantially at the center of the back surface of the mobile terminal 6 in the left-right direction. Further, the grip part 34 is disposed substantially at the center of the back surface of the mobile terminal 6 in the up-down direction. As described above, the grip part 34 is arranged near the position of the center of gravity of the rectangle.

The weight of the mobile terminal 6 can be considered to act vertically downward from the position of the center of gravity of the mobile terminal 6. In the present embodiment, the grip part 34 is disposed immediately below the position of the center of gravity of the mobile terminal 6, and accordingly, the weight of the mobile terminal 6 acts substantially vertically on the palm of the hand.

In the safety switch device, the grip part can be disposed on the periphery part of the back surface of the mobile terminal. For example, the grip part can be disposed at one end of the mobile terminal in the left-right direction. In this respect, the position of the center of gravity of the mobile terminal is located laterally away from the grip part. A force is applied to the operator' hand in the rotational direction of the mobile terminal (the direction in which the position of the center of gravity of the mobile terminal moves downward). In other words, a force is applied to the operator's hand in a twisting direction. For this reason, when the operator operates the mobile terminal for a long time, the operator's arm becomes tired.

Alternatively, if the mobile terminal is heavy, the operator's arm becomes tired even in a short-time operation.

In contrast, in the present embodiment, the operator can hold the operation device 81 such that, for example, the screen of the mobile terminal 6 is parallel to the horizontal direction. In this respect, the operator's hand 78 is disposed almost immediately below the position of the center of gravity of the mobile terminal 6. It is possible to prevent a force from being applied to the operator's arm in the rotational direction of the mobile terminal. For this reason, the fatigue of the operator's arm can be reduced. In particular, when the operation device is used for a long time, the fatigue of the operator can be reduced. Alternatively, when a heavy mobile terminal is used, the fatigue of the operator can be reduced.

The fixation mechanism 47 of the present embodiment can secure a plurality of types of mobile terminals having different sizes. When a mobile terminal having a size different from that of the mobile terminal 6 of the present embodiment is secured by the first safety switch device 21, the grip part 34 may slightly deviate from a position immediately below the position of the center of gravity of the mobile terminal, and may be disposed near a position immediately below the position of the center of gravity. However, even in this respect, it is possible to prevent the grip part from being disposed on the periphery of the mobile terminal. In other words, the grip part is disposed at the center part of the shape of the back surface of the mobile terminal, which corresponds to the position of the center of gravity of the mobile terminal. Here, the phrase "disposed so as to correspond to the position of the center of gravity of the mobile terminal" means that the grip part is disposed at a position immediately below the position of the center of gravity of the mobile terminal, or in the vicinity of the position immediately below the position of the center of gravity of the mobile terminal. Even when the grip part 34 is disposed in the vicinity of the position immediately below the center of gravity of the mobile terminal 6, this safety device can reduce the fatigue of the operator more than the safety device in which the grip part is disposed on the periphery of the back surface of the mobile terminal.

Referring to FIGS. 4, 5 and 7, a cavity is formed inside the grip part 34. An electronic circuit board 55 that will be described later is disposed in the cavity. The grip part 34 in the present embodiment has a mountain-shaped section when cutting along the line perpendicular to the longitudinal direction designated by arrow 93. The contact surface 34a is formed into a curved surface so as to be easily grasped by the hand 78. The contact surface 34a is formed so that the central portion protrudes outward and the side portions gradually lower from the central portion toward the both sides.

The grip part 34 has a symmetrical shape in a direction perpendicular to the longitudinal direction, in the sectional shape. FIG. 7 shows a center line 90 which passes through the center of the grip part 34 in the left-right direction designated by arrow 92. The center line 90 is a line passing through the center of the grip part 34 in the width direction. The shape of the contact surface 34a of the grip part 34 is formed symmetrically with respect to the center line 90. The grip part 34 has a sectional shape which is symmetrical with respect to the center line 90. By adopting this configuration, the operator can hold the grip part 34 with the right hand as well as the left hand. Then, the operator can operate the mobile terminal 6 with the hand opposite to the hand holding the grip part 34. Note that the sectional shape of the grip part does not have to have a symmetric shape. For example, when the grip part is to be grasped by the left hand, the contact surface may be formed so as to correspond to the shape of the palm of the left hand.

Referring to FIGS. 4 and 5, the safety switch device 21 of the present embodiment includes belts 61a, 61b as press members formed so as to press operator's hand 78 against the grip part 34. The belts 61a, 61b are formed of a shape-variable material, such as synthetic leather. The belts 61a, 61b are formed such that the operator's hand 78 is disposed between the belts 61a, 61b and the grip part 34. The belts 61a, 61b extend along the longitudinal direction of the grip part 34. The belt 61a is secured to one end of the grip part 34 in the longitudinal direction. The belt 61b is secured to the other end of the grip part 34 in the longitudinal direction. The belt 61a and the belt 61b are formed so that they can be secured to or separated from each other by a securing member such as a hook-and-loop fastener or a button.

The operator can secure the back of the hand (the upper side of the hand) with the belts 61a, 61b after grasping the grip part 34 with the hand 78. With the belts 61a, 61b, the operator's hand 78 can be pressed against the grip part 34. Further, it is possible to prevent the operator's hand 78 from moving away from the grip part 34. As a result, the operator can stably hold the operation device 81 even with one hand. Further, the operator can stably hold the operation device 81 without strongly grasping the grip part 34.

The press member is not limited to a belt, and may be any member formed to prevent the operator's hand from moving away from the grip part. For example, instead of the belt, a cover member, such as a cloth formed so as to cover the back of the hand can be adopted. Then, the covering member can be opened or closed with, for example, a fastener. The operator can secure his/her hand on the grip part by putting his/her hand into the open cover member and closing the fastener or the like.

Referring to FIGS. 3 to 5, the first safety switch device 21 includes an emergency stop button 52 and an enable switch 51 as operation switches for ensuring the safety of the operator or the robot. The emergency stop button 52 is a button for transmitting a signal for immediately stopping the machine being driving. The enable switch 51 is a permission switch for transmitting a signal for permitting the machine to operate. For example, the operator can operate the machine while pressing the enable switch 51. Thus, when the operator releases the enable switch 51, the machine is automatically stopped.

The enable switch 51 is disposed on the back side of the safety switch device 21 (on the opposite side of the side on which the screen of the mobile terminal 6 is disposed). The enable switch 51 of the first safety switch device 21 is disposed on the upper end surface of the grip part 34 when the operator holds the operation device 81. The enable switch 51 is formed so as to protrude in a direction parallel to the longitudinal direction of the grip part 34. By adopting this configuration, as shown in FIG. 4, the operator can press the enable switch 51 with the thumb while holding the grip part 34. Alternatively, the operator can press the enable switch 51 with the index finger.

Further, the enable switch 51 is disposed on an end face of the grip part 34 and thereby enabling the operator to press the enable switch 51 with a finger of the hand holding the grip part 34 when the operator grasps the grip part 34 with the right hand as well as when the operator grasps the grip part 34 with the left hand. Further, the operator can press and release the enable switch 51 at any time while holding the grip part 34.

The emergency stop button 52 of the present embodiment is disposed on the front side of the safety switch device 21 (the side on which the screen of the mobile terminal 6 is disposed). The emergency stop button 52 in the present embodiment is disposed on the upper end of the first support member 31. By adopting this configuration, the operator can press the emergency stop button 52 with the hand opposite to the hand supporting the mobile terminal 6.

Note that the permission switch and the emergency stop button can be disposed at any positions in the safety switch device. For example, the permission switch may be disposed on a side surface of the grip part as will be described later. Further, the emergency stop button may be disposed on the surface of the front of the second support member.

Referring to FIGS. 2 to 5, the safety switch device 21 is connected to the robot controller 4 by the cable 53. A signal, which indicates that the emergency stop button 52 or the enable switch 51 has been pressed, is transmitted to the robot controller 4 through the cable 53. For example, when the emergency stop button 52 is pressed, an emergency stop signal is transmitted to the robot controller 4. The robot controller 4 stops driving the robot 1 and driving the hand 2. Further, a signal, which indicates that the enable switch 51 has been pressed, is transmitted to the robot controller 4. If a signal, which indicates that the enable switch 51 has been pressed, is not received, the robot controller 4 stops the robot 1 and the hand 2. Further, while the enable switch 51 is being pressed, the robot controller 4 drives the robot 1 and the hand 2 in accordance with the operation of the mobile terminal 6.

The mobile terminal 6 of the present embodiment is connected to the safety switch device 21 via a cable 54. In the present embodiment, the safety switch device 21 is formed so as to be able to communicate with the mobile terminal 6 using a USB (Universal Serial Bus) signal. Further, the safety switch device 21 is formed so as to be able to communicate with the robot controller 4 using an Ethernet (registered trademark) signal. The safety switch device 21 includes an electronic circuit board 55 having an electronic circuit for converting an Ethernet signal to a USB signal or converting a USB signal to an Ethernet signal. The communication between the mobile terminal and the safety switch device and the communication between the safety switch device and the robot controller may be performed wirelessly.

Further, the safety switch device 21 of the present embodiment is supplied with electricity from the robot controller 4 via the cable 53. The safety switch device 21 has a function of supplying electricity to the mobile terminal 6 via the cable 54. The electronic circuit board 55 has a function of converting a voltage. The mobile terminal 6 can charge the internal storage battery with electricity supplied through the cable 54.

The mobile terminal 6 of the present embodiment has function of a camera. A lens 71 for capturing an image is disposed on the back side of the mobile terminal 6. A hole 33 is formed in the first support member 31 at a position corresponding to the lens 71. The operation device 81 of the present embodiment can capture an image using the function of the camera included in the mobile terminal 6. As described above, a hole corresponding to the position of the lens may be formed in the fixation mechanism 47 so that an image can be captured by the function of the camera included in the mobile terminal.

Figure 8:
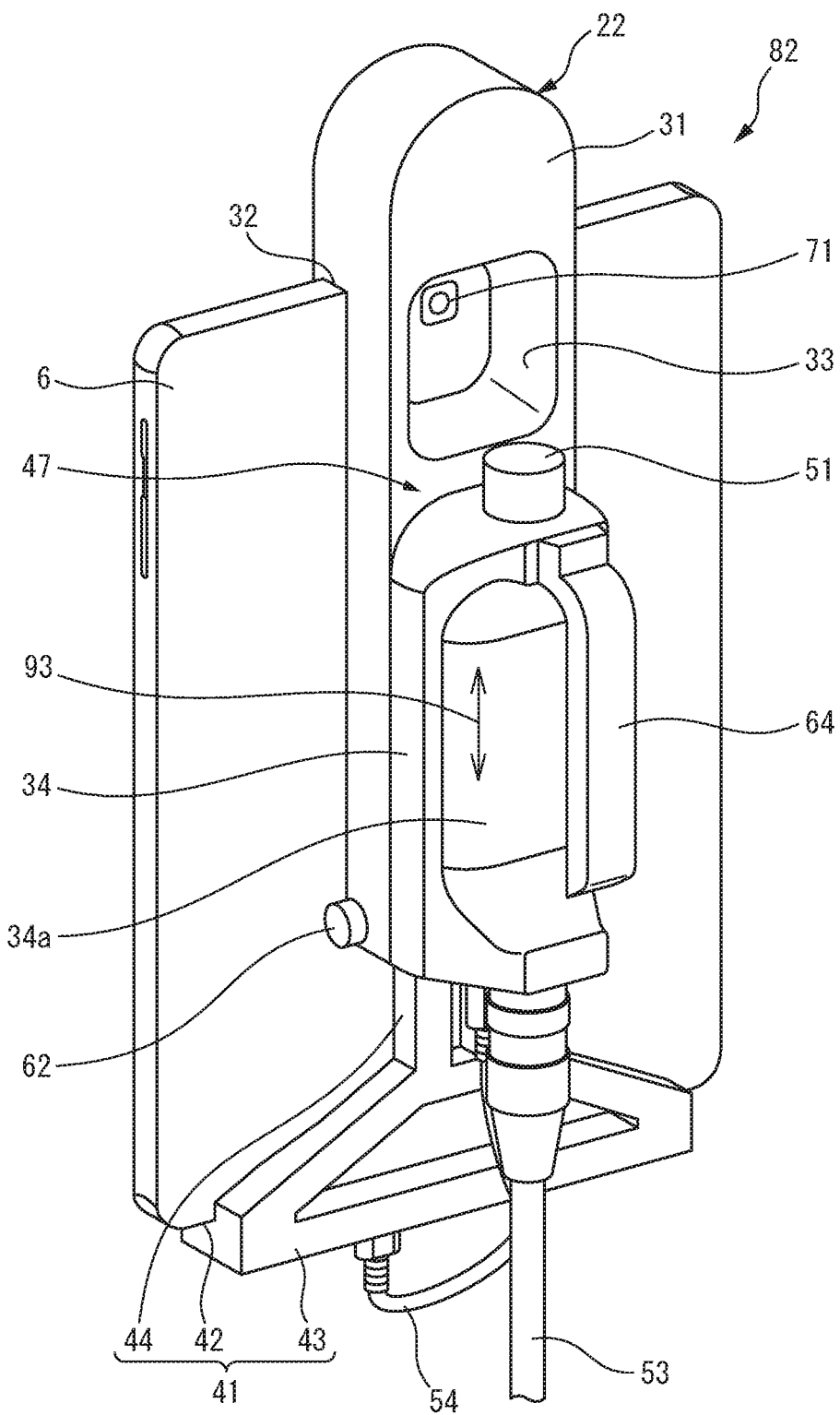
FIG. 8 is a perspective view of a second operation device in the embodiment when viewed from the rear side.

FIG. 8 is a perspective view of a second operation device in the present embodiment when viewed from the back side. The second operation device 82 includes a second safety switch device 22. The second safety switch device 22 differs from the first safety switch device 21 in a press member for preventing the operator's hand from moving away from the grip part 34. The second safety switch device 22 has a press member 64 for holding the operator's hand. The press member 64 is formed of a material which does not deform. For example, the press member 64 is formed of resin or the like.

The press member 64 is formed so as to extend downward from the upper end of the grip part 34. The press member 64 extends along the longitudinal direction of the grip part 34 designated by arrow 93. A space into which the operator's hand is to be inserted is formed between the grip part 34 and the press member 64. The press member 64 has a shape which extends away from the grip part 34 and along the grip part 34. The operator can insert his/her hand between the grip part 34 and the press member 64. The press member 64 can prevent the operator's hand from separating from the grip part 34 by coming into contact with the back of the operator's hand.

As described above, the press member 64 can be formed of a material which does not deform. Only the upper end of the press member 64 shown in FIG. 8 is secured to the grip part 34. However, the embodiment is not limited to this. The lower end of the press member may be secured to the grip part 34.

Figure 9:
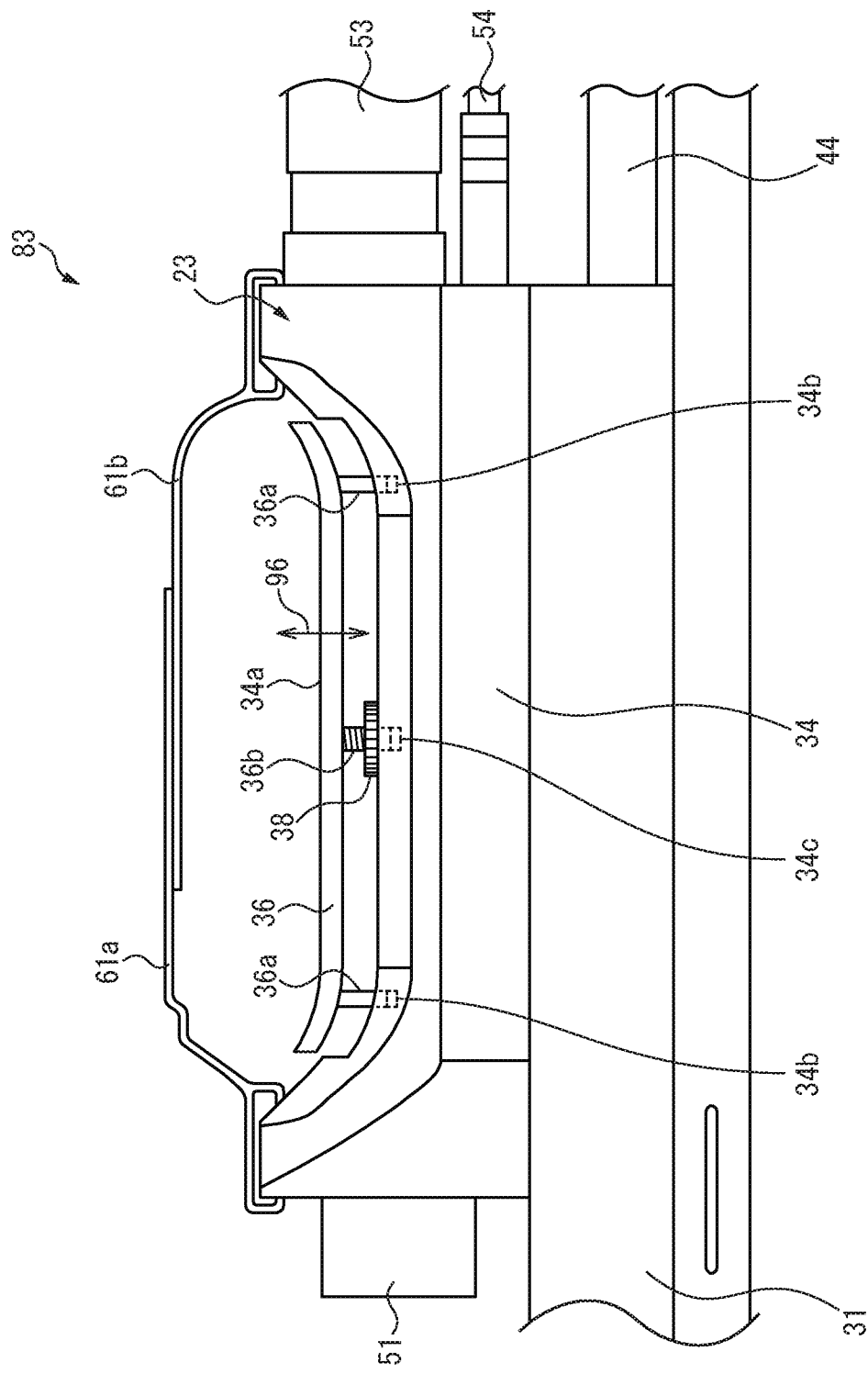
FIG. 9 is an enlarged side view of a grip part of a third operation device in the embodiment.

FIG. 9 is an enlarged side view of a third operation device in the present embodiment. The third operation device 83 includes a third safety switch device 23. The third safety switch device 23 differs from the first safety switch device 21 in the structure of the grip part 34.

The grip part 34 of the third safety switch device 23 includes a movement member 36 formed so as to be movable with respect to the main body of the grip part 34. The movement member 36 includes a contact surface 34a with which the palm of the operator is to come into contact. The movement member 36 has support rods 36a extending toward the main body of the grip part 34. The main body of the grip part 34 has holes 34b into which the support rods 36a are inserted. The holes 34b are formed so that the support rods 36a slide therethrough.

The movement member 36 has a rod-shaped part 36b on which a male screw is formed. The main body of the grip part 34 has a hole 34c into which the rod-shaped part 36b is inserted. The rod-shaped part 36b extends toward the hole 34c of the main body of the grip part 34. A dial 38 having a female screw is engaged with the rod-shaped part 36b. The dial 38 is formed into a disk shape. The operator can move the rod-shaped part 36b, as designated by arrow 96, by turning the dial 38. As a result, the movement member 36 moves toward the belts 61a, 61b, or moves away from the belts 61a, 61b.

As described above, by adopting the configuration in which the portion of the grip part 34, which includes the contact surface 34a, moves toward the press member, the size of the space into which the operator's hand is to be inserted can be adjusted. The size of the space, into which the operator's hand is to be inserted, can be changed in accordance with the size of the operator's hand. Thus, the operator can more stably hold the operation device. Alternatively, the fatigue of the operator can be reduced.

Figure 10:
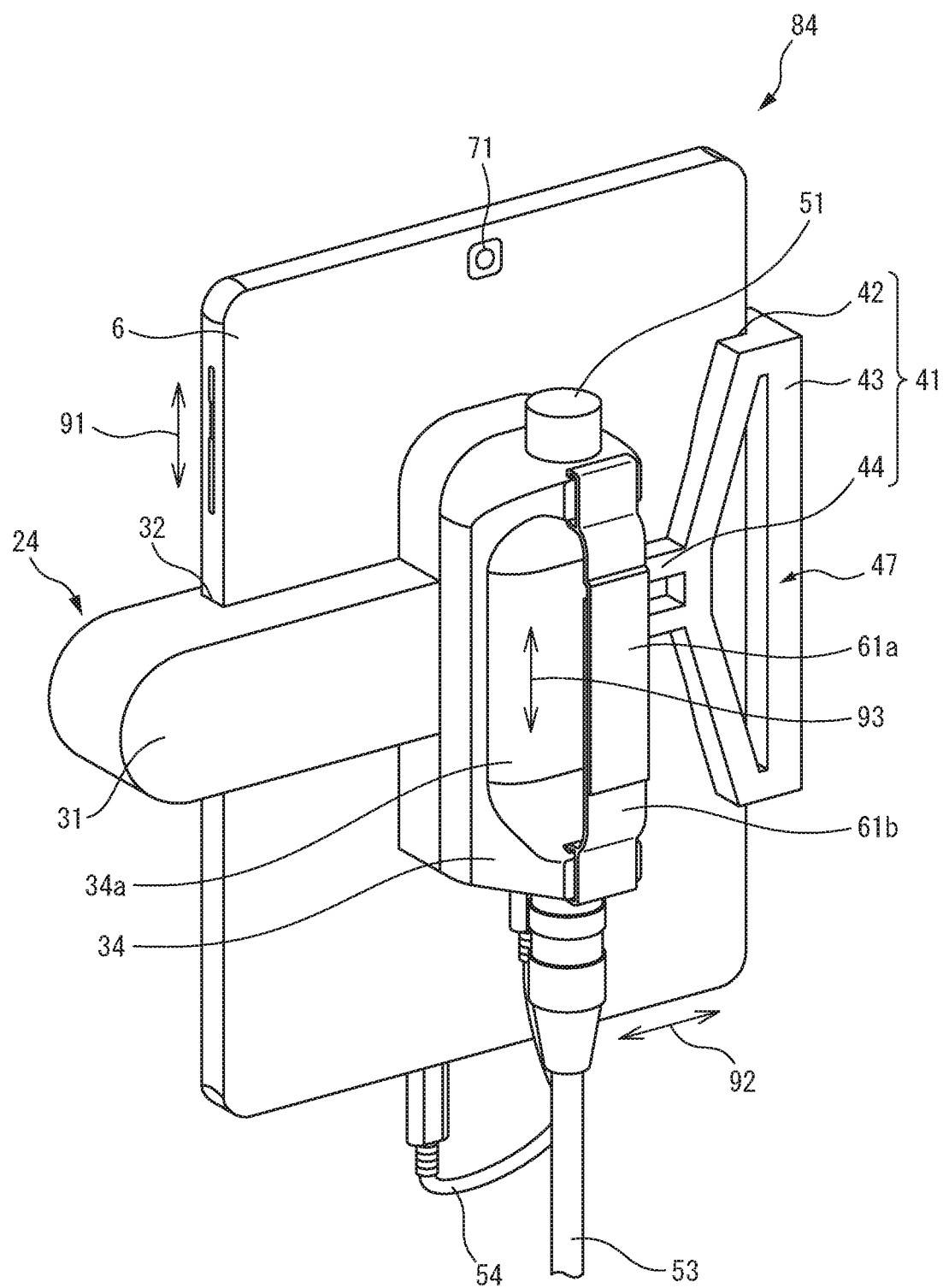
FIG. 10 is a perspective view of a fourth operation device in the embodiment when viewed from the rear side.
Figure 11:
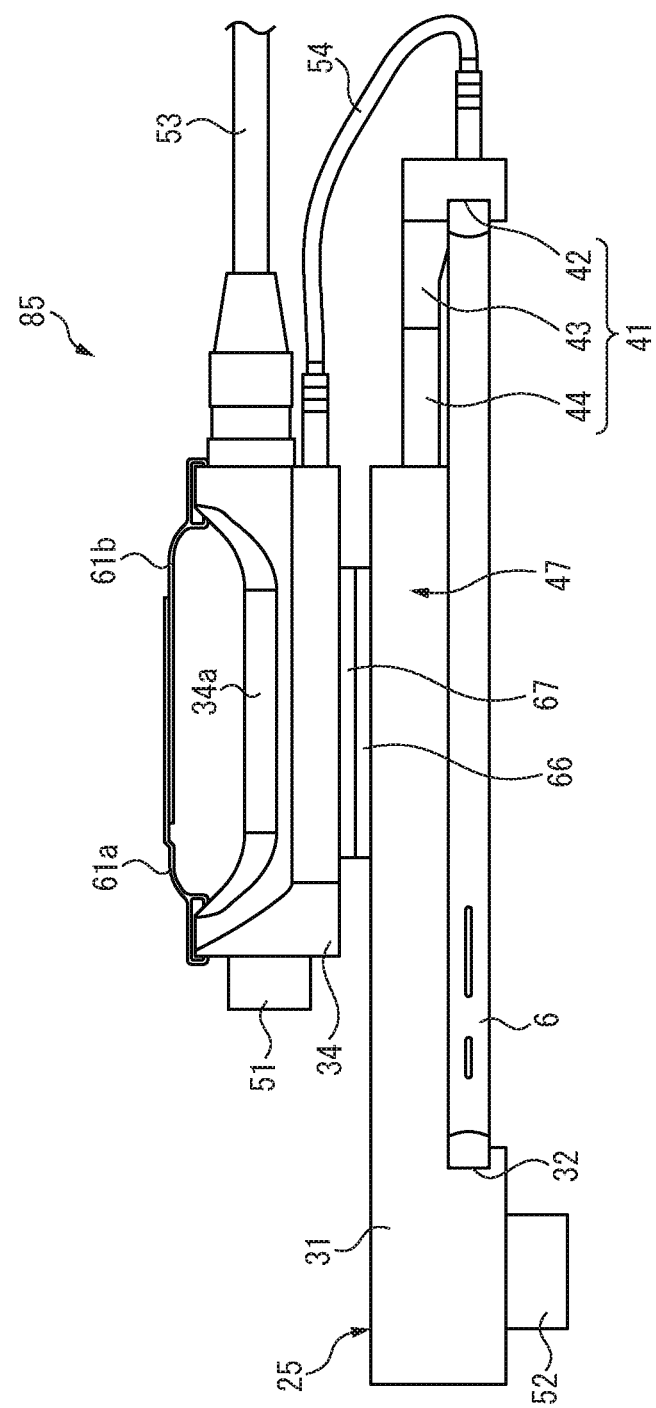
FIG. 11 is a side view of a fifth operation device in the embodiment.

FIG. 10 is a perspective view of a fourth operation device in the present embodiment when viewed from the back side. The fourth operation device 84 includes a fourth safety switch device 24. In the above-described safety switch device, the first support member 31 and the second support member 41 are formed so as to extend in the up-down direction designated by arrow 91 when the operator holds the operation device. The fixation mechanism 47 of the fourth safety switch device 24 has a structure in which the mobile terminal 6 is sandwiched in the left-right direction when the operator holds the fourth operation device 84.

The first support member 31 and the second support member 41 of the fourth safety switch device 24 are formed so as to extend in the left-right direction designated by arrow 92. The first support member 31 is engaged with one end of the mobile terminal 6 in the left-right direction. Further, the second support member 41 is engaged with the other end of the mobile terminal 6 in the left-right direction. In contrast, the grip part 34 is disposed such that the longitudinal direction of the grip part 34 designated by arrow 93 is parallel to the up-down direction of the operation device 84 designated by arrow 91.

As described above, the fixation mechanism 47 may be formed such that the first support member 31 and the second support member 41 extend in the left-right direction. Further, the first support member and the second support member may be formed so as to sandwich the mobile terminal in any direction.

FIG. 1 is a side view of a fifth operation device in the present embodiment. The fifth operation device 85 includes a fifth safety switch device 25. The fifth safety switch device 25 differs from the first safety switch device 21 in the configuration in which the grip part 34 rotates with respect to the fixation mechanism 47. The fifth safety switch device 25 is formed such that the grip part 34 rotates with respect to the first support member 31 and the second support member 41.

The fifth safety switch device 25 has a stationary plate 66 secured to the fixation mechanism 47 and a rotary plate 67 secured to the grip part 34. In the present embodiment, the stationary plate 66 is secured to the first support member 31. The rotary plate 67 is formed so as to rotate with respect to the stationary plate 66. The rotary plate 67 of the present embodiment is formed so as to rotate around the rotation axis which passes through the position of the center of gravity of the mobile terminal 6 or the vicinity of the position of the center of gravity and which extends in a direction perpendicular to the back surface of the mobile terminal 6. The safety switch device 25 is formed so that the rotary plate 67 can be secured to the stationary plate 66 by a securing member such as a screw.

Figure 12:
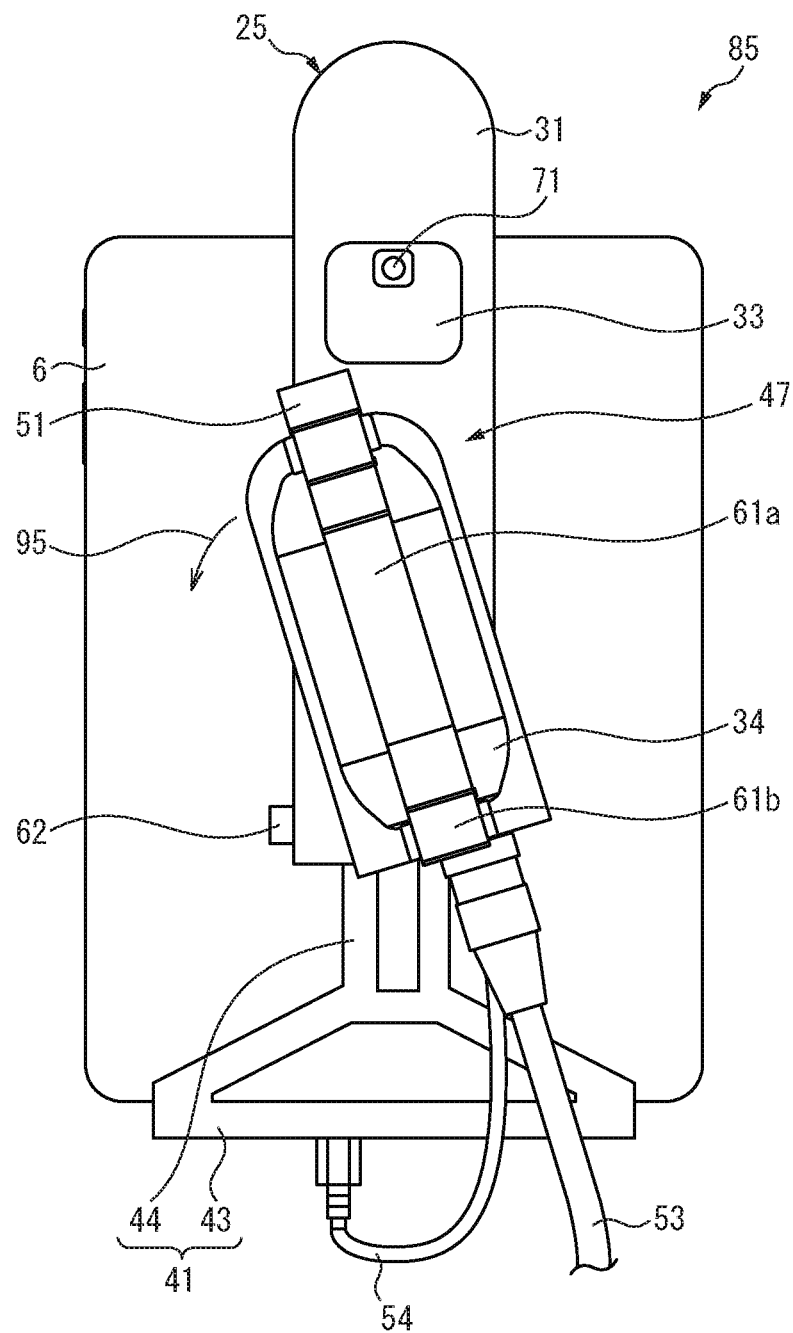
FIG. 12 is a rear view of the fifth operation device.

FIG. 12 is a rear view of a fifth operation device. The grip part 34 of the fifth safety switch device 25 rotates, as designated by arrow 95, with respect to the fixation mechanism 47 including the first support member 31. When the position of the grip part 34 with respect to the fixation mechanism 47 is decided, the rotary plate 67 can be secured to the stationary plate 66 by the securing member.

In the fifth safety switch device 25, the angle of the grip part 34 with respect to the fixation mechanism 47 can be adjusted. In other words, the mobile terminal 6 can be rotated in accordance with the type of the operation. The operator can adjust the angle of the mobile terminal 6 so as to easily see the display 72 of the mobile terminal 6. For example, the direction of the mobile terminal 6 can be adjusted so that the longitudinal direction of the mobile terminal 6 extends in the up-down direction, or the direction of the mobile terminal 6 can be adjusted so that the longitudinal direction of the mobile terminal 6 extends in the left-right direction. As described above, the grip part 34 may be formed so as to be rotatable with respect to the fixation mechanism 47. A long cable can be used as the cable 54 which connects the grip part 34 with the mobile terminal 6. Alternatively, when the rotation angle of the mobile terminal 6 with respect to the grip part 34 is changed, the cable may be replaced with a cable having a length in accordance with the rotation angle.

Figure 13:
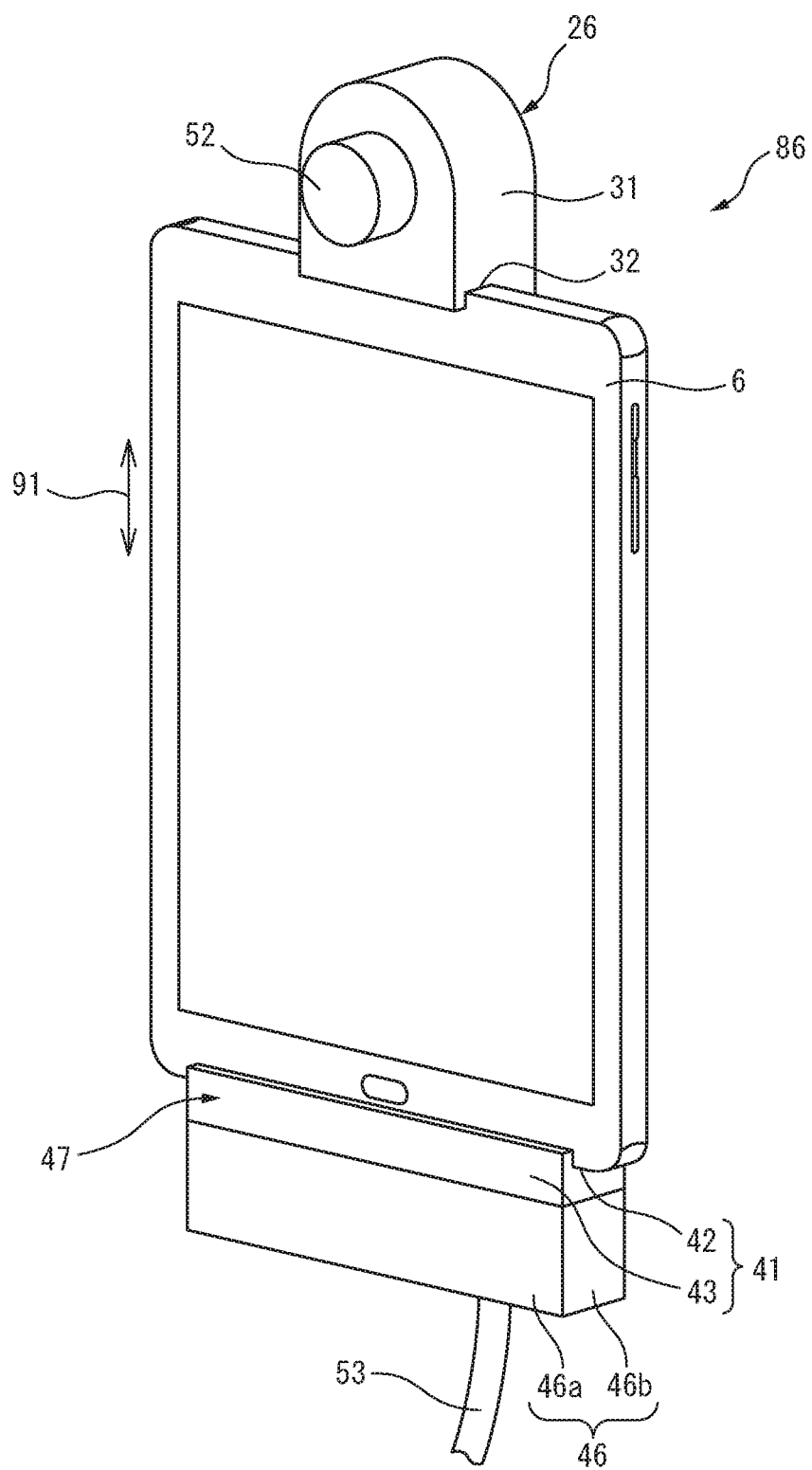
FIG. 13 is a perspective view of a sixth operation device in the embodiment when viewed from the front side.
Figure 14:
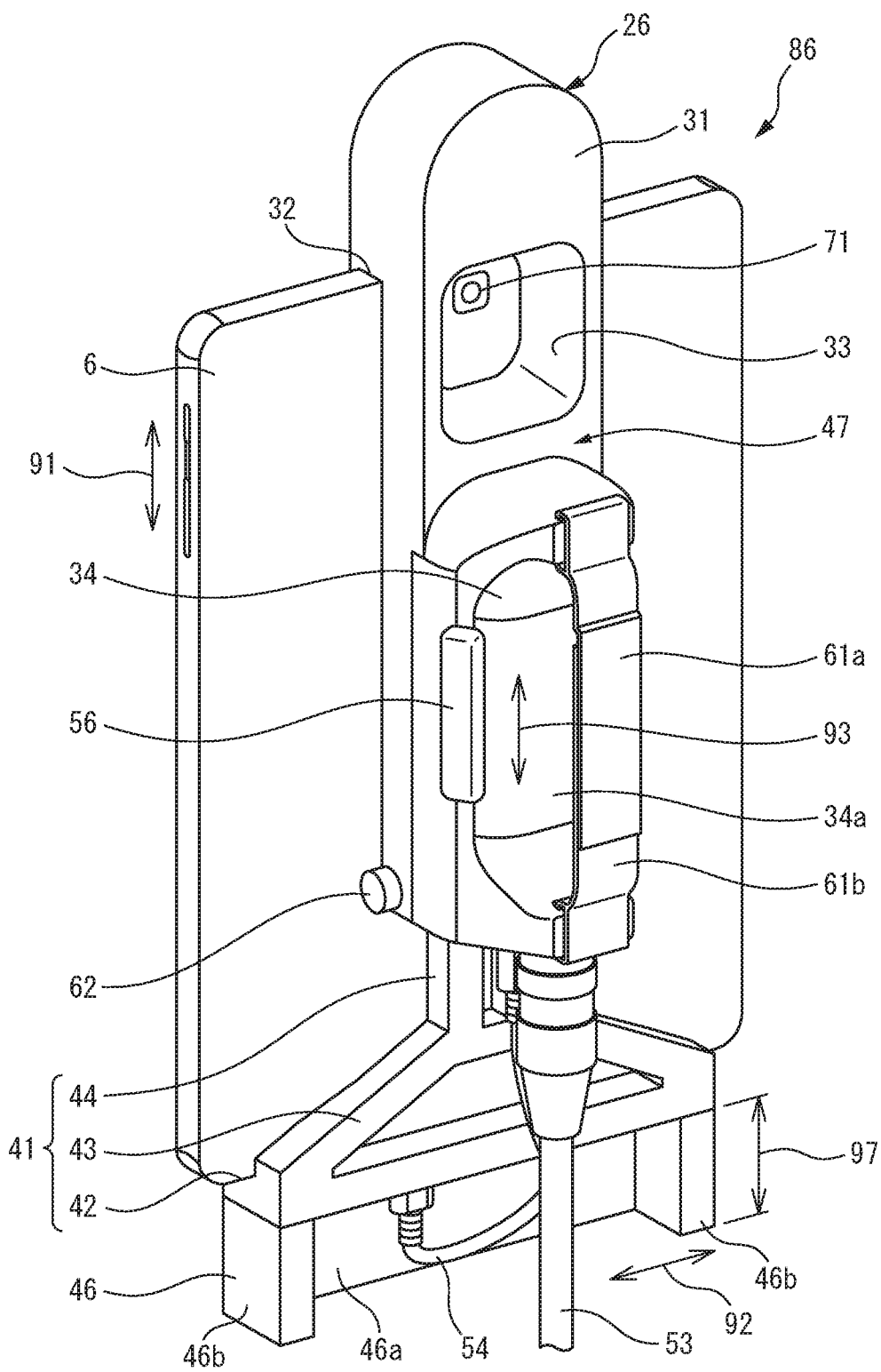
FIG. 14 is a perspective view of the sixth operation device when viewed from the rear side.
Figure 15:
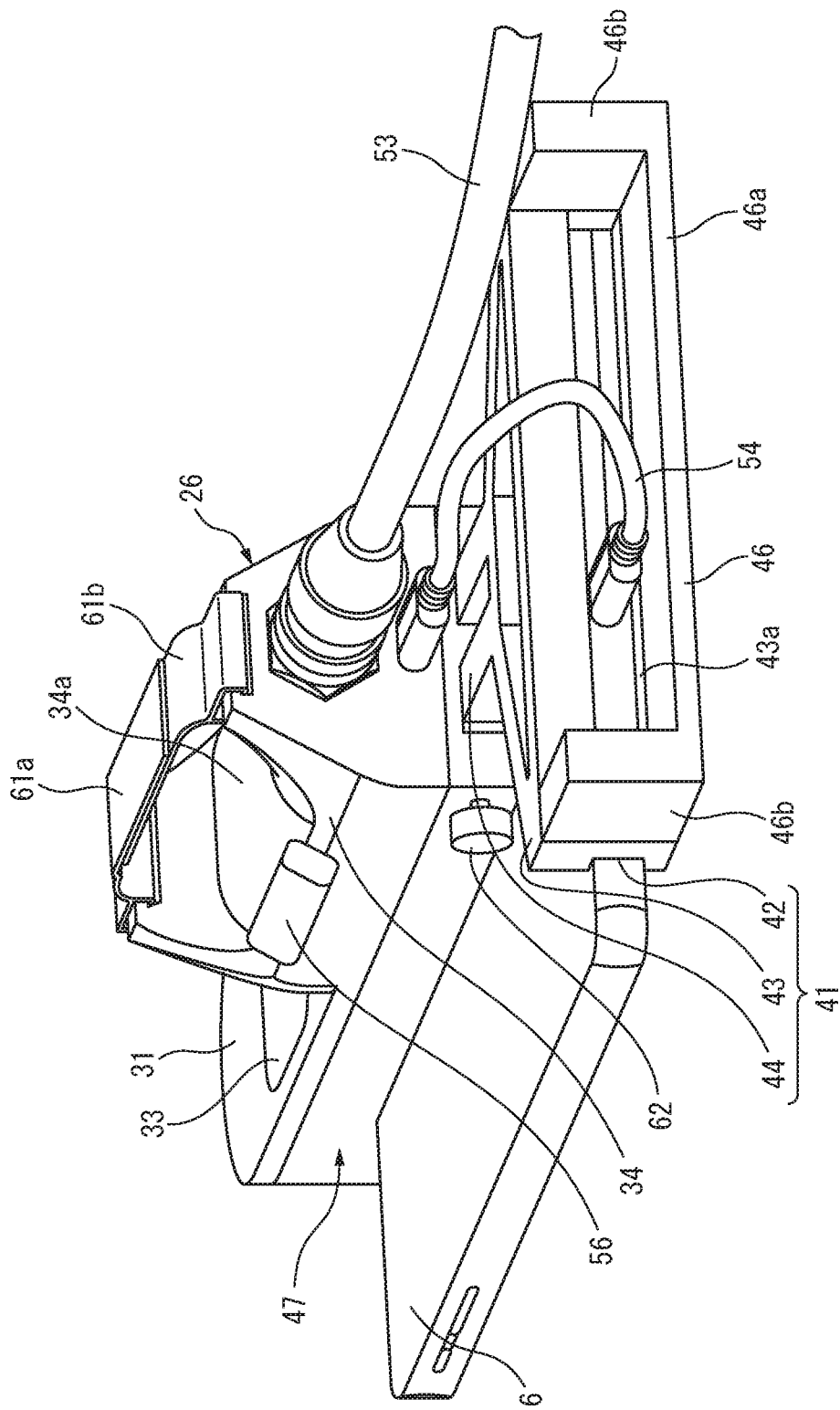
FIG. 15 is a perspective view of the sixth operation device when viewed from below.

FIG. 13 is a perspective view of a sixth operation device in the present embodiment when viewed from the front side. FIG. 14 is a perspective view of the sixth operation device when viewed from the back side. FIG. 15 is a perspective view of the sixth operation device when viewed from below. Referring to FIGS. 13 to 15, the sixth operation device 86 includes a sixth safety switch device 26 attached to the mobile terminal 6. Further, the sixth safety switch device 26 differs from the first safety switch device 21 in the structure including a protection member 46 for protecting the cable 54. The sixth safety switch device 26 differs from the first safety switch device 21 in the position of the enable switch 56.

Referring to FIG. 15, a hole 43a is formed in the engagement part 43 of the second support member 41. The cable 54 connecting the safety switch device 26 with the mobile terminal 6 is inserted into the hole 43a. Referring to FIGS. 13 to 15, a connecting port for the cable 54 in the grip part 34 is disposed on the lower end face of the grip part 34 when the operator holds the operation device 86. A connecting port for the cable 54 in the mobile terminal 6 is disposed on the lower end face of the mobile terminal 6. For this reason, when the cable 54 is connected to the safety switch device 26 and the mobile terminal 6, the cable 54 is bent in a U-shape when viewed in plane. The cable 54 is disposed so as to protrude from the lower end face of the mobile terminal 6.

The sixth safety switch device 26 includes a protection member 46 which protects the cable 54. The protection member 46 is secured to the second support member 41. The protection member 46 of the present embodiment is formed into a plate shape. The protection member 46 has a wall part 46a disposed on the front side of the cable 54 (the side on which the screen of the mobile terminal 6 is disposed) and wall parts 46b disposed on the side of the cable 54. The protection member 46 is formed so as to surround a U-shaped part of the cable 54 connected to the mobile terminal 6, which protrudes from an end surface of the mobile terminal 6. The height of the protection member 46 designated by arrow 97 is formed so as to be higher than the height of the cable 54 protruding from the end face of the mobile terminal 6.

Referring to FIGS. 3 and 4, in the first safety switch device 21 of the present embodiment, when the operator holds the first operation device 81, the cable 54 protrudes below the mobile terminal 6. When the first operation device 81 is operated while being carried, the cable 54 may come into contact with the operator's body or other devices. As a result, a force may be applied to the cable 54 and the cable 54 may be damaged.

Referring to FIGS. 13 to 15, in the sixth safety switch device 26 of the present embodiment, the protection member 46 is disposed around the cable 54 and thereby comes into contact with the operator's body and other devices. For this reason, it is possible to avoid the cable 54 from coming into contact with the operator's body or other devices, and it is possible to prevent the cable 54 from being damaged.

The protection member 46 of the present embodiment is secured to the lower surface of the second support member 41, but the embodiment is not limited to this. The protection member 46 can be disposed in a space around the cable 54 which connects the mobile terminal 6 and the safety switch device 26. For example, a cable connecting port of the mobile terminal may be formed on an end face of the mobile terminal in the left-right direction. In this respect, the protection member can be disposed via a support member extending from the fixation mechanism 47 toward the connecting port for the cable 54. Alternatively, the grip part is not disposed at the center part of the shape of the back surface of the mobile terminal but may be disposed at one end of the mobile terminal in the left-right direction. Also in this respect, the protection member can be disposed via a support member extending from the fixation mechanism 47 toward the cable connecting port. Further, the protection member may be secured to the first support member, or may be secured to both the first support member and the second support member.

Next, referring to FIG. 14, the sixth safety switch device 26 is formed so as to be grasped by the operator's left hand. In the sixth safety switch device 26, the enable switch 56 as a permission switch is disposed on a side surface of the grip part 34. The enable switch 56 has a shape extending along the longitudinal direction of the grip part 34 designated by arrow 93. By adopting this configuration, the operator can press the enable switch 56 with the index finger, the middle finger, and the ring finger of the hand while grasping the grip part 34. The operator can press the enable switch 56 at any time. In this manner, the permission switch can be disposed at a position at which the operator can operate the switch with any finger when holding the grip part.

Figure 16:
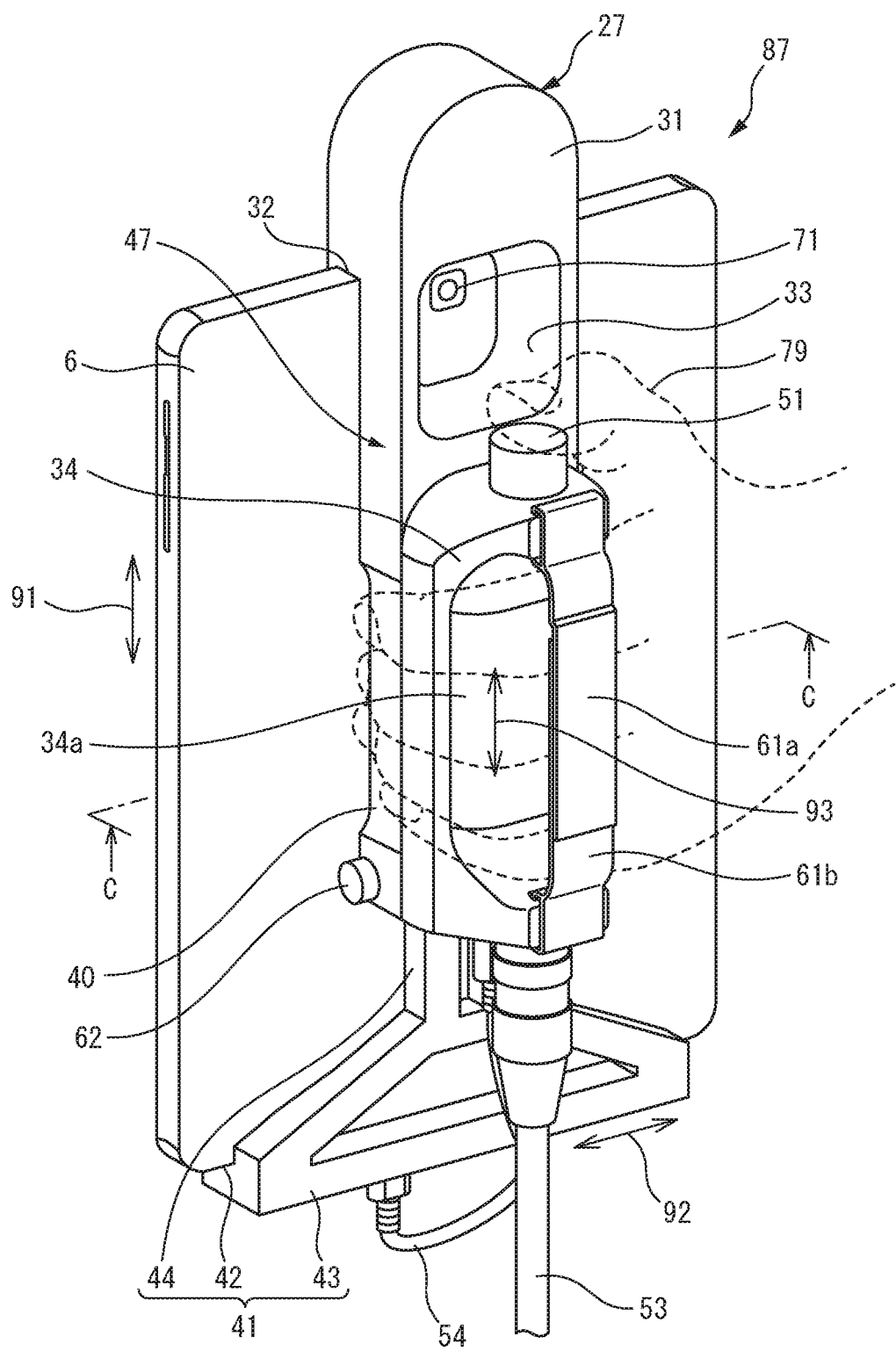
FIG. 16 is a perspective view of a seventh operation device when viewed from the rear side.
Figure 17:
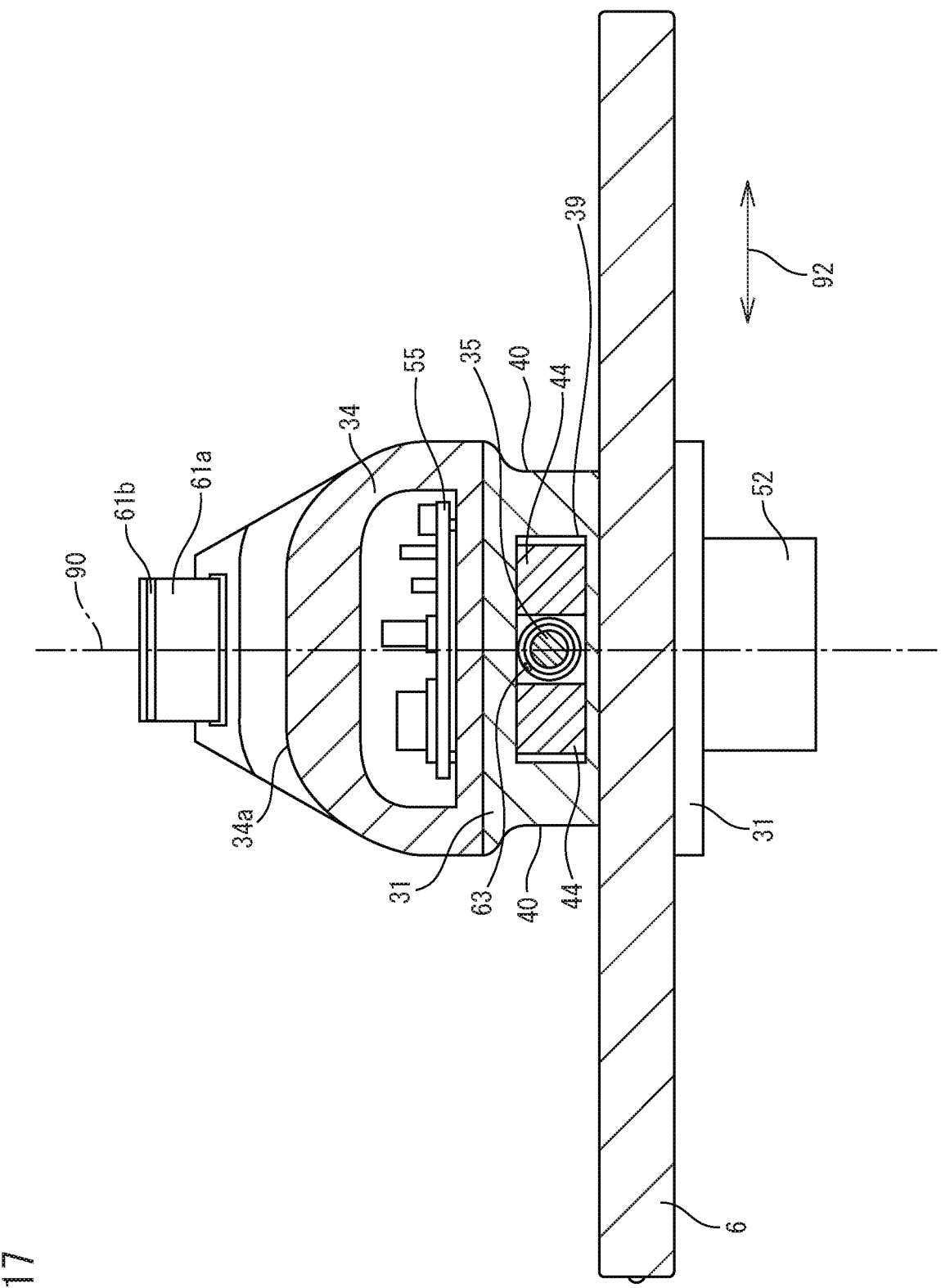
FIG. 17 is a sectional view of the seventh operation device.

FIG. 16 is a perspective view of a seventh operation device of the present embodiment when viewed from the back side. FIG. 17 is a sectional view when cutting along line C-C in FIG. 16. FIG. 16 is a perspective view showing that the operator grasps the grip part 34 with the left hand. Referring to FIGS. 16 and 17, the seventh operation device 87 includes a seventh safety switch device 27. The seventh safety switch device 27 differs from the first safety switch device 21 in the structure of the fixation mechanism 47.

The first support member 31 and the grip part 34 have substantially the same width in the left-right direction designated by arrow 92. In the seventh safety switch device 27, a dent part 40 for engaging with a finger of the operator's hand 79 is formed on a side surface of the first support member 31 of the fixation mechanism 47. The dent part 40 is formed so as to extend along the extending direction of the first support member 31. The dent part 40 is formed so as to be recessed from the side surface of the grip part 34. The dent part 40 is formed at a position with which at least one of the index finger, the middle finger, the ring finger, and the little finger of the operator's hand is to engage. The dent part 40 of the present embodiment is large enough to engage with the index finger, the middle finger, the ring finger, and the little finger.

When grasping the safety switch device 27, the operator can place the index finger, the middle finger, the ring finger, and the little finger in the dent part 40 and grasp the grip part 34. The fingertip of each finger can be hooked on the dent part 40 so as to grasp the grip part 34. For this reason, the operator can stably grasp the grip part 34. As a result, the fatigue of the operator can be reduced more than in the safety switch device having no dent part 40.

The seventh safety switch device 27 is formed so as to be grasped by the right hand as well as the left hand of the operator. For this reason, in the seventh safety switch device 27, the dent part 40 is formed on both the left side surface and the right side surface of the first support member 31, but the embodiment is not limited to this. When the safety switch device is formed so as to be grasped by either the left hand or the right hand, a dent part can be formed on the side surface on which the index finger, the middle finger, the ring finger, and the little finger of the grasping hand are arranged.

Further, in the seventh safety switch device 27, the dent part 40 is formed in the fixation mechanism 47, but the embodiment is not limited to this. When the grip part is formed so as to be high, a dent part may be formed in the grip part. Alternatively, a dent part may be formed at the boundary part between the grip part and the fixation mechanism. In this respect, a dent part is formed in both the grip part and the fixation mechanism. In this way, the dent part can be formed on at least one of the grip part and the fixation mechanism.

The fixation mechanism 47 of the present embodiment is formed so that the first support member 31 and the second support member 41 sandwich the mobile terminal 6 in order to secure the mobile terminal 6, but the embodiment is not limited to this. The fixation mechanism can secure the mobile terminal by any mechanism. For example, the fixation mechanism may be formed so as to secure the mobile terminal to the safety switch device with a screw. Alternatively, for example, the fixation mechanism can include a base member having a recess part corresponding to the shape of the mobile terminal. A recess part having a square planar shape can be formed in the base member so that the mobile terminal is fitted into the recess part.

The machines operated by the operation device in the present embodiment are a robot and a hand, but the embodiment is not limited to this. The structure of the present embodiment can be applied to an operation device of any machine. For example, the safety switch device and the operation device in the present embodiment can be applied to a machine tool. In particular, the safety switch device and the operation device in the present embodiment are suitable for a numerically controlled machine tool.

According to an aspect of the present disclosure, it is possible to provide a safety switch device and an operation device including the safety switch device, which reduce the fatigue of an operator when the operator performs an operation.

The above embodiments can be combined as appropriate. In the respective drawings described above, the same or equivalent parts are denoted by the same reference numerals. Note that the above embodiments are only for illustrative purposes and do not limit the invention. Further, the embodiments include modifications of the embodiments described in the claims.

The invention claimed is:

1. A safety switch device attached to a mobile terminal for operating a machine, comprising:
   a fixation mechanism formed so as to secure the mobile terminal;
   a grip part supported by the fixation mechanism, which is to be grasped by a hand of an operator;
   a permission switch which is disposed on the grip part and which transmits a signal for permitting the machine to operate; and
   an emergency stop button for transmitting a signal for stopping the machine, wherein
      the fixation mechanism is formed so as to secure a plurality of types of the mobile terminals having different sizes; and
      the grip part is supported by the fixation mechanism so as to be disposed at a center part of a shape of a back surface of the mobile terminal, which corresponds to the position of the center of gravity of the mobile terminal,
   wherein the grip part has a longitudinal direction, and
      the permission switch is disposed on an end face of the grip part, and is formed so as to protrude in a direction parallel to the longitudinal direction.

2. The safety switch device according to claim 1, wherein the fixation mechanism includes:
   a first support member having a first recess part to be engaged with one end of the mobile terminal;
   a second support member having a second recess part to be engaged with the other end of the mobile terminal; and
   a securing member for securing the second support member to the first support member,
   the second support member is formed so as to slide with respect to the first support member, and
   the first support member and the second support member sandwich the mobile terminal such that the fixation mechanism secures the mobile terminal.

3. The safety switch device according to claim 1, wherein the grip part has a symmetrical sectional shape with respect to a center line in the width direction of the grip part when cutting along the line perpendicular to the longitudinal direction.

4. The safety switch device according to claim 1, further comprising a protection member secured to the fixation mechanism, wherein the protection member is disposed around a cable when the safety switch device is connected to the mobile terminal by the cable, and is formed so as to be higher than the height of the cable protruding from the mobile terminal.

5. The safety switch device according to claim 1, wherein the grip part has a longitudinal direction, the safety switch device further comprises a press member for preventing the hand of the operator from moving away from the grip part, and the press member extends along the longitudinal direction such that the hand of the operator is disposed between the press member and the grip part.

6. The safety switch device according to claim 1, wherein at least one of the fixation mechanism and the grip part has a dent part formed on a side surface, and the dent part is formed at a position to be engaged with at least one of the index finger, the middle finger, the ring finger, and the little finger when the operator grasps the grip part.

7. A machine operation device comprising:

the safety switch device according to claim 1; and the mobile terminal secured to the safety switch device.

* * * * *